United States Patent
Kurz et al.

(10) Patent No.: US 11,391,333 B2
(45) Date of Patent: *Jul. 19, 2022

(54) BRAKE SYSTEM DAMPING DEVICE HAVING AN OUTLET

(71) Applicant: Robert Bosch GmbH, Stuttgart (DE)

(72) Inventors: Edgar Kurz, Heilbronn-Horkheim (DE); Wolfgang Schuller, Cleebronn (DE)

(73) Assignee: Robert Bosch GmbH, Stuttgart (DE)

( * ) Notice: Subject to any disclaimer, the term of this patent is extended or adjusted under 35 U.S.C. 154(b) by 42 days.

This patent is subject to a terminal disclaimer.

(21) Appl. No.: 16/906,291

(22) Filed: Jun. 19, 2020

(65) Prior Publication Data

US 2021/0018053 A1 Jan. 21, 2021

(30) Foreign Application Priority Data

Jul. 18, 2019 (DE) .................... 10 2019 210 649.8

(51) Int. Cl.
*B60T 17/04* (2006.01)
*F16D 65/00* (2006.01)

(52) U.S. Cl.
CPC .......... *F16D 65/0006* (2013.01); *B60T 17/04* (2013.01)

(58) Field of Classification Search
CPC . B60T 8/4068; F16F 9/049; F16F 9/04; F16F 9/0436; F16F 9/0481; F16L 55/04; F16L 55/041
See application file for complete search history.

(56) References Cited

U.S. PATENT DOCUMENTS

| | | | | |
|---|---|---|---|---|
| 5,655,569 A | * | 8/1997 | Tackett | B60T 8/4068 138/30 |
| 5,718,488 A | * | 2/1998 | Schneider | B60T 8/4068 138/30 |
| 6,017,099 A | * | 1/2000 | Schneider | B60T 8/4872 303/87 |
| 9,234,531 B2 | * | 1/2016 | Wald | B60T 17/04 |
| 2021/0054890 A1 | * | 2/2021 | Kurz | F16L 55/053 |

FOREIGN PATENT DOCUMENTS

WO WO-0181812 A1 * 11/2001 ............ F16L 55/053

* cited by examiner

*Primary Examiner* — Nicholas J Lane

(57) ABSTRACT

A brake system damping device includes a first chamber to which hydraulic pressure is applied, a second chamber in which a compressible medium is located, a first separating element separating the first chamber from the second chamber, a third chamber in which a compressible medium is located, and a second separating element separating the second chamber from the third chamber. The second chamber is connected to the third chamber in a medium-conducting manner by an outlet formed in the second separating element, and a closing element by means of which the outlet can be closed in a movement direction as soon as the hydraulic pressure in the first chamber has reached a predefined pressure value. The outlet is formed on its side facing the second chamber with at least one outlet opening, the cross-sectional area of which is oriented substantially in the movement direction of the closing element.

15 Claims, 7 Drawing Sheets

BRAKE SYSTEM DAMPING DEVICE HAVING AN OUTLET

This application claims priority under 35 U.S.C. § 119 to application no. DE 10 2019 210 649.8, filed on Jul. 18, 2019 in Germany, the disclosure of which is incorporated herein by reference in its entirety.

The disclosure relates to a brake system damping device having a first chamber to which hydraulic pressure must be applied and a second chamber in which a compressible medium is located. A first separating element is used to separate the first chamber from the second chamber. In addition, the brake system damping device comprises a third chamber in which a compressible medium is located and a second separating element for separating the second chamber from the third chamber. The second chamber in this case is connected to the third chamber in a medium-conducting manner by means of an outlet formed in the second separating element and a closing element by means of which the outlet can be closed in a movement direction as soon as the hydraulic pressure in the first chamber has reached a predefined pressure value can be moved with the first separating element.

BACKGROUND

Brake systems, in particular hydraulic brake systems, are used to decelerate the driving speed of vehicles such as passenger vehicles and heavy-goods vehicles, for example. Different dynamic effects occur during the operation of brake systems of this kind, including pressure fluctuations in the lines and chambers present there which lead to oscillations or pulsations and therefore to unwanted noises and vibrations. In order to minimize oscillations of this kind or to achieve a damping effect with these oscillations, brake system damping devices, hereinafter also referred to as dampers, are used at one or multiple installation sites in the brake system. These dampers comprise a first chamber in which a hydraulic pressure has to be applied. The chamber is a kind of container in principle. The pressure is, in principle, the result of a force acting on a surface. In the dampers, a force is transmitted hydraulically, in other words via a pressurized fluid.

Dampers with a separating element which divides the chamber into a first chamber, in which a liquid or a fluid is contained, and a second chamber, in which a compressible medium, usually in the form of a gas, is contained, are known in the art. As is generally known, the volume of a chamber of a deformable container in which a gas is located diminishes when a greater pressure is applied to said container from outside. In the same way, the volume of the second chamber is also reduced by means of the separating element when hydraulic pressure is applied to the first chamber.

If this pressure abates once again, the volume of gas, and therefore of the second chamber, also increases again accordingly. The second chamber therefore acts like a pneumatic spring, also known as a gas spring. The softness or hardness of the damping provided by this gas spring depends on the gas volume of the second chamber. The greater the gas volume is, the softer the damping.

During a braking action, a vehicle driver presses on a brake pedal which covers a pedal travel in the process. This pedal travel is directly related to the gas volume of the second chamber when is relevant here. The greater the gas volume, the longer the pedal travel too. The positive effect of soft damping is therefore offset by the negative effect of a large pedal travel distance.

SUMMARY

The damper according to the disclosure has a third chamber, which like the second chamber, contains the compressible medium which is preferably formed by a gas and, particularly preferably, by air. The second separating element separates the third from the second chamber, wherein the two chambers initially remain connected by means of the medium-conveying outlet, however. The outlet or link is preferably formed by a simple bore and can be closed by means of the closing element of the first separating element. The closing element is preferably simply a surface region on the surface of the first separating element. This closing element only closes the outlet when there is sufficient hydraulic pressure for this in the first chamber. Specifically, the first separating element is particularly deformed from the predefined pressure value to such an extent that it then rests against the second separating element. The second separating element therefore preferably forms a limit stop for the closing element.

On account of the closed outlet, the third chamber is then disconnected from the second chamber and is therefore no longer available for the remaining damper. For the further damping action above the predefined pressure value, there only remains the medium volume in the second chamber. This is relatively small on account of the first separating element deformed in the direction of the second separating element. Consequently, the damper according to the disclosure only has a lower elasticity and damping effect, since the second chamber can scarcely increase in volume. The effect in this case is that a pedal travel, or else the travel of a brake pedal in the brake system, is no longer substantially lengthened when actuated by means of a vehicle driver.

When the outlet is closed, the first separating element may even rest completely against the inner wall of the second chamber, including the side of the second separating element facing the second chamber, so that the second chamber completely disappears or has no further volume. The pedal travel is then no longer extended at all from the predefined pressure value. The lost damping effect which likewise results from this is justifiable, since the pressure region which is relevant to damping lies below the predefined pressure value.

The pressure value is therefore preferably selected or predefined in such a manner that it represents the upper limit value of a pressure range which is relevant to damping. The respective volumes of the second and third chamber in this case are preferably adjusted to the relevant pressure range and the desired elasticity or damping effect of the damper. In this advantageous manner, the damper connects the high elasticity of the large medium volume in the pressure range which is relevant to damping to a limitation of the volume that can be received by the first chamber above this pressure range. In other words, there is no longer any direct correlation between the displaced volume of brake medium and the medium volume used for damping. The damper therefore provides outstanding damping properties with a short pedal travel.

A further advantage is that the pressure in the closed-off third chamber is substantially lower than the pressure in the second chamber would be without an outlet to a further chamber, in other words in the prior art. Unwanted effects are thereby reduced. On the one hand, when there is lower pressure the permeation through the first separating element reduces; on the other hand, the temperature of the medium when there is lower pressure is not as high, which means that material ageing of the first separating element is delayed.

The problem addressed by the disclosure is that of providing a device for vibration damping in a brake system with improved damping properties.

According to the disclosure, a brake system damping device with a first chamber is created, to which hydraulic pressure must be applied, and a second chamber in which a compressible medium is located, and with a first separating element for separating the first chamber from the second chamber. The brake system damping device according to the disclosure further has a third chamber in which a compressible medium is located, and a second separating element for separating the second chamber from the third chamber, wherein the second chamber is connected to the third chamber in a medium-conducting manner by means of an outlet formed in the second separating element, and wherein a closing element by means of which the outlet can be closed in a movement direction as soon as the hydraulic pressure in the first chamber has reached a predefined pressure value can be moved with the first separating element. According to the disclosure, the outlet is formed on its side facing the second chamber with at least one outlet opening, the cross-sectional area of which is oriented substantially in the movement direction of the closing element.

The cross-sectional area of the at least one outlet opening according to the disclosure does not extend, as is customary, transversely to the movement direction from a closing element that closes it, but substantially in this movement direction. The cross-sectional area therefore extends in the direction in which the closing element is also moved. It is thereby achieved that the closing element does not rest directly against edges of the outlet opening and can be fitted into the outlet opening itself. In this way, the closing element can also be prevented from sticking or becoming jammed in the outlet opening itself. Instead of this, the closing element covers the outlet opening wholly, or over a wide area, and rests against bearing regions which are further away from the outlet opening. In this way, a jamming or firm attachment of the closing element to the outlet opening and the associated outlet is reliably prevented and high operational reliability is at the same time achieved in a very cost-effective manner.

The at least one outlet opening is preferably configured as a slot. A slot in this case is understood to mean an opening area which has a comparatively long slot length (of 1 millimeter and more, in particular) and a comparatively small slot width (of less than 1 millimeter, in particular). With this kind of slot, the slot width thereof preferably extends in the movement direction of the closing element. This kind of outlet opening can therefore be opened and closed with a comparatively small movement of the closing element. At the same time, the comparatively long slot length provides a comparatively large cross-sectional area with a low flow resistance.

Between two and four, in particular three, outlet openings are preferably provided. These are advantageously arranged distributed over the circumference of a circular cylinder. Multiple and in particular an odd number of outlet openings creates an irregular flow pattern through the outlet and therefore a flow through the outlet according to the disclosure which has fewer pressure surges and pressure fluctuations.

In addition, the outlet according to the disclosure is preferably covered on its side facing the second chamber by means of a convex cap. This kind of cap creates a thorn-like bearing surface for the first separating element on which said separating element can be supported without locking on the associated at least one outlet opening. The convex shape of the cap at the same time helps the first separating element to rest against said cap without a graduation or bending edge and therefore free from kinks.

In an advantageous embodiment, the second separating element is produced by means of injection molding, preferably by means of powder injection molding, and particularly preferably by means of metal injection molding. Injection molding—also referred to as injection molding method—is a production method, more accurately a primary forming method for the production of components. In this process the respective material is liquefied using an injection molding machine and injected under pressure into a mold. Powder injection molding, also PIM method, is a primary forming method for the production of components made of metal or ceramic. Consequently, metal injection molding, also MIM method, is a primary forming method for the production of metal components in particular. By means of these technologies, the second separating element or the diaphragm carrier component can be produced very easily and cost-effectively as an intrinsic component.

In addition, the outlet is preferably formed on its side facing away from the second chamber by means of a central outlet channel. The central outlet channel should very advantageously be configured as a central element in an injection mold of this kind, particularly when producing the second separating element by means of an injection molding die or an injection mold. Furthermore, this kind of outlet channel may be sized comparatively easily as a central channel.

The second separating element can be produced particularly easily, in that it is produced by means of injection molding in an injection mold with a lower mold half and an upper mold half and the at least one outlet opening is produced as an interface between the lower mold half and the upper mold half. In this way, cores within the injection mold can, in particular, be dispensed with.

In an advantageous embodiment the brake system damping device has a support structure supporting the second separating element and passing through the third chamber, particularly in the form of a rib structure. The support structure of this kind has, in particular, a structure end side and at least one structural rib. The rib structure in this case is preferably arranged on the second separating element on the side facing away from the first separating element or on the side with the separating element outer wall, in order to support the second separating element against pressure acting on the separating element inner wall. The separating element outer wall therefore forms a first end side of the rib structure. The opposite or second end side of the rib structure is formed by the structure end side which is preferably planar in design. The structural rib is a bearing element of the supporting rib structure and extends from the separating element outer wall up to the structural end side. The brake system damping device is more inherently stable on account of the supporting function of the rib structure. In addition, the material of the second separating element is less stressed, which has a positive impact on its service life.

The rib structure is preferably formed with two or more structural ribs, in order to provide the rib structure with greater stability. Moreover, the rib structure is advantageously configured with a perpendicular circular hollow cylinder which is positioned centrally on the separating element outer wall and extends, starting therefrom, up to the second end of the rib structure or the structure end side. A cylinder cavity formed in the circular hollow cylinder is preferably connected to the outlet in the second separating element in a medium-conducting manner in this case. It should be explicitly stated at this point that under no circumstances should the outlet in the second separating element be closed by the rib structure.

The structural ribs are positioned on the outside of the circular hollow cylinder and have at these points—hereinafter referred to as attachment points—an extent or rib depth which corresponds to the length of the circular hollow cylinder. From these attachment points the structural ribs extend away from the circular hollow cylinder preferably radially or in a radiating manner, as a result of which a star-shaped structure is created. In this case the rib depth of each structural rib varies according to the shape of the adjacent end sides of the rib structure. As has already been mentioned, the structure end side is preferably planar and does not therefore cause a variation in rib depth. The separating element outer wall, on the other hand, is usually uneven or of three-dimensional design. The rib depth in each case must then vary or be formed to correspond to the separating element outer wall. The stability of the rib structure is thereby further enhanced.

The rib structure preferably forms at least two structural sub-chambers which are connected to one another in a medium-conducting manner by means of at least one connection channel. The structural sub-chambers in this case are each formed by means of at least one structural rib, the separating element outer wall, and a further component surrounding the third chamber. This component is preferably a cover. The structural sub-chambers in this case are preferably arranged in such a manner that a supporting rib structure is created or the supporting effect of the rib structure is further strengthened. The connection channel is an opening in an element, preferably a structural rib, which separates the two structure chambers from one another. In this way, the compressible medium from the second chamber reaches each of the structural sub-chambers of the divided third chamber and thereby generates damping for the brake system damping device. In addition, however, a lower degree of damping can also be set—if required—by sealing off individual structural sub-chambers or closing off individual connection channels.

If the rib structure is configured with the circular hollow cylinder, as described above for an advantageous embodiment, a connection channel preferably leads to each of the structural sub-chambers from this cylinder cavity. In this way, a uniform dispersal of the medium, and therefore an equal load on all regions of the rib structure, can be achieved.

In a nearest advantageous development of the disclosure, the first separating element is configured with a diaphragm, preferably with a rolling diaphragm. In this case, diaphragms should basically be understood to be sealing elements which, as elastic, movable partition walls or separating elements, hermetically separate two chambers from one another. In this case, rolling diaphragms in particular are only provided for one-sided pressure loading in the direction of a loop inner side or diaphragm head depression. Rolling diaphragms only offer negligibly low inherent rigidity to volume changes or low resistance to elastic deformation. Rolling diaphragms are therefore particularly ideally suited as a separating element for the brake system damping device according to the disclosure on account of their shaping.

The first separating element is advantageously produced from an elastomer, preferably from ethylene-propylene-diene rubber. Elastomers are dimensionally stable but elastically deformable plastics. These plastics may therefore deform under tensile and compressive load, but then return to their original undeformed shape. Consequently, elastomers are particularly well-suited materials for separating elements within the meaning of this disclosure, such as for the rolling diaphragm described above, for example.

The elastomer must retain its elasticity and must neither swell nor shrink excessively. Therefore, a suitable elastomer must be used for the medium being sealed. Ethylene Propylene Diene Monomer rubber, also referred to as EPDM rubber for short, is an elastomer that is resistant to brake medium and is therefore particularly suited to use in the brake system damping device according to the disclosure.

In addition, the predefined pressure value is advantageously predefined according to the disclosure at a value between 0 and 30 bar, preferably within the range of 3 to 10 bar, and particularly preferably 5 bar. If a brake system applies a pressure of roughly 60 bar to an associated wheel of a vehicle, this will reliably cause the wheel to lock. For vibration or pulsation damping in brake systems, however, only a substantially smaller, limited pressure range is relevant. When a pressure value of roughly 5 bar is reached, the disruptive vibration or pulsation will already be sufficiently damped. The pressure value should therefore be particularly advantageously set at this value.

In addition, the outlet is preferably formed using an open-pored material. An open-pored material is one that contains pores which prevent liquids from penetrating but allow gases to leave or pass through. This material is also described as breathable. The pores would be closed following the application of the first separating element in just the same way as differently shaped outlets such as bores, for example. The advantage of the open-pored material is that no liquid can penetrate the third chamber. This provides the brake system with additional protection against an outflow of brake fluid from the brake system, for example if the first separating element were to be damaged or leaking.

Moreover, multiple outlets are preferably provided in the second separating element. These outlets ensure a quicker redistribution of the medium from the second chamber into the third during the braking action. In this way, the elasticity of the entire medium volume can be more effectively utilized.

In addition, further embodiments which make the brake system damping device even more efficient or are supplemented with alternative embodiments are advantageous.

In a further advantageous embodiment, the third chamber is subdivided into multiple sub-chambers which are each connected to the second chamber in a medium-conducting manner by means of an outlet. Multiple sub-chambers allow greater flexibility compared with the use of only one single third chamber. The outlets to the individual sub-chambers are therefore preferably closed one after the other by means of the first separating element, as a result of which the damping effect is reduced gradually and not completely and suddenly at the one predefined pressure value. Moreover, by means of the closing and reinstatement of outlets, a variable number of sub-chambers, and therefore a variable medium volume, can be used. This allows the damper to be adjusted to the relevant pressure range and the desired elasticity.

Hence, the compressible medium which is contained in the second and third chamber is preferably in the form of a gas and particularly preferably air. Air is readily available, can be used and compressed at no cost, and is therefore ideally suited to use in the brake system damping device according to the disclosure.

The medium volume or else the second and third chamber are produced or created alternatively and advantageously by means of a combination of multiple rotating, cold-formed or deep-drawn parts. Rotating parts are components with a circular cross section; cold-formed parts are closure components and deep-drawn parts are body components of vehicles. All these components are therefore easy to procure in the automobile industry and are repurposed by means of the disclosed arrangement.

In addition, the brake system damping device is preferably provided for use in vehicle dynamic control systems and/or power brake systems. A vehicle dynamic control system or Electronic Stability Program, also known as ESP, is an electronically controlled driver assistance system for a motor vehicle which prevents the vehicle from swerving by selectively applying the brakes to individual wheels. A power brake system or a power brake assembly is operated by means of externally generated power. For example, an electro-hydraulically actuated brake is a power brake in which the actuating energy comes from a hydraulic pressure accumulator which is charged by a pump.

BRIEF DESCRIPTION OF THE DRAWINGS

Exemplary embodiments of the solution according to the disclosure are explained in greater detail with the help of the attached schematic drawings. In the drawings.

DETAILED DESCRIPTION

Figure 1:
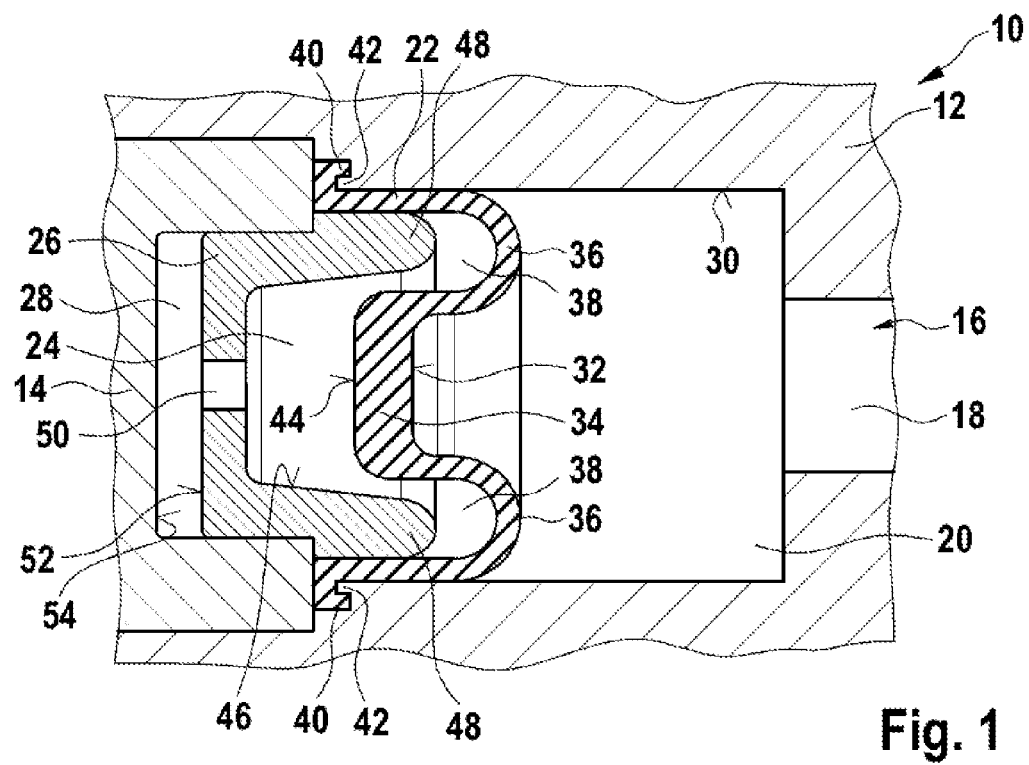
FIG. 1 shows a first example of a brake system damping device, such as that underlying the disclosure.

FIG. 1 shows a brake system damping device 10 with a housing 12 and a cover 14. A supply line 16 in which there is no hydraulic pressure present in this case, depicted by means of a crossed arrow 18, is arranged in the housing 12. The supply line 16 opens into a first chamber 20, to which a first separating element 22—in this case a rolling diaphragm—is attached. Viewed from the first chamber 20, behind the first separating element 22 is located a second chamber 24, to which a second separating element 26 is attached, wherein a third chamber 28 is located behind the second separating element 26 in the viewing direction.

These chambers 20, 24, 28 and separating elements 22, 26 look in detail as follows. The first chamber 20 is surrounded by an inner housing wall 30 and a first separating element inner wall 32 of the first separating element 22, referred to below as a rolling diaphragm. A closing element 34, from which the separating element 22 extends further outwardly to a diaphragm fold 26, is arranged in the center of the separating element 22 and integrally formed therewith. Located within the diaphragm fold 36, or surrounded thereby, is a diaphragm fold depression 38. Subsequent to the diaphragm fold 26, the separating element 22 extends as far as a diaphragm collar 40 which encloses a coupling mount 42 of the housing 12. The separating element 22 configured as a rolling diaphragm rests with part of its separating element inner wall 32 in a sealing manner against the housing inner wall 30, and faces the second chamber 24 with a first separating element outer wall 44. The second chamber 24 is surrounded by the first separating element outer wall 44 and a second separating element inner wall 46 of the second separating element 26.

The second separating element 26 extends with a diaphragm holding mechanism 48 into the diaphragm fold depression 38. An outlet 50 which connects the second chamber 24 to the third chamber 28 is arranged in the center of the second separating element 26. In this case, the outlet 50 leads through the second separating element inner wall 46, the second separating element 26, and a second separating element outer wall 52. The third chamber 28 is surrounded by the second separating element outer wall 52 and a cover inner wall 54 of the cover 14.

In the initial state of the brake system damping device 10 as depicted, there is no hydraulic pressure 18 to begin with in the first chamber 20 in which a brake medium is located. The separating element 22 which is produced from an elastomer is substantially in its basic form here. In this case it rests against the housing inner wall 30 in such a manner that the first chamber 20 is hermetically sealed in respect of the second chamber 24, wherein a gas is located in the second chamber 24, in this case air in particular. This gas is also located in the third chamber 28 which is connected by means of the outlet 50 to the second chamber 24. Consequently, these two chambers 24, 28 create a joint gas volume available for damping. Due to the greater elasticity of this gas volume, during braking or during the application of hydraulic pressure to the first chamber 20, an improved damping effect is achieved.

If hydraulic pressure is present in the first chamber 20, the separating element 22 becomes deformed in such manner that the gas volume in the second chamber 24 reduces. The closing element 34 moves during this into the second chamber 24. From a given hydraulic pressure which is fixed above a pressure range which is relevant to damping, the closing element 34 rests against the second separating element inner wall 46 of the second separating element 26 and closes the outlet 50 to the third chamber 28. The second separating element 26 acts as a limit stop during this process. States of the brake system damping device 10 in which the separating element 22, or the closing element 34 thereof, rests against the second separating element 26 and closes the outlet 50, are depicted in FIG. 2 and FIG. 3.

On account of the closed outlet 50, the third chamber 28 is separated from the second chamber 24, as a result of which only the gas volume remaining in the second chamber 24 can still be used for further damping. The elasticity and damping effect is still only small, because the second chamber 24 can scarcely increase its volume. This effect is intentional because it means that the travel of a brake pedal connected to the brake system is no longer substantially increased either. With the state of the brake system damping device 10 depicted in FIG. 3, the separating element 22 and the second separating element 26 lie next to one another in a complete or full-face manner, so that the second chamber 24 completely disappears or no longer has any volume. In this case, the travel of the brake pedal is not further extended.

As soon as the hydraulic pressure present in the first chamber 20 abates, the separating element 22 moves back again into its initial state or its initial position.

Figure 2:
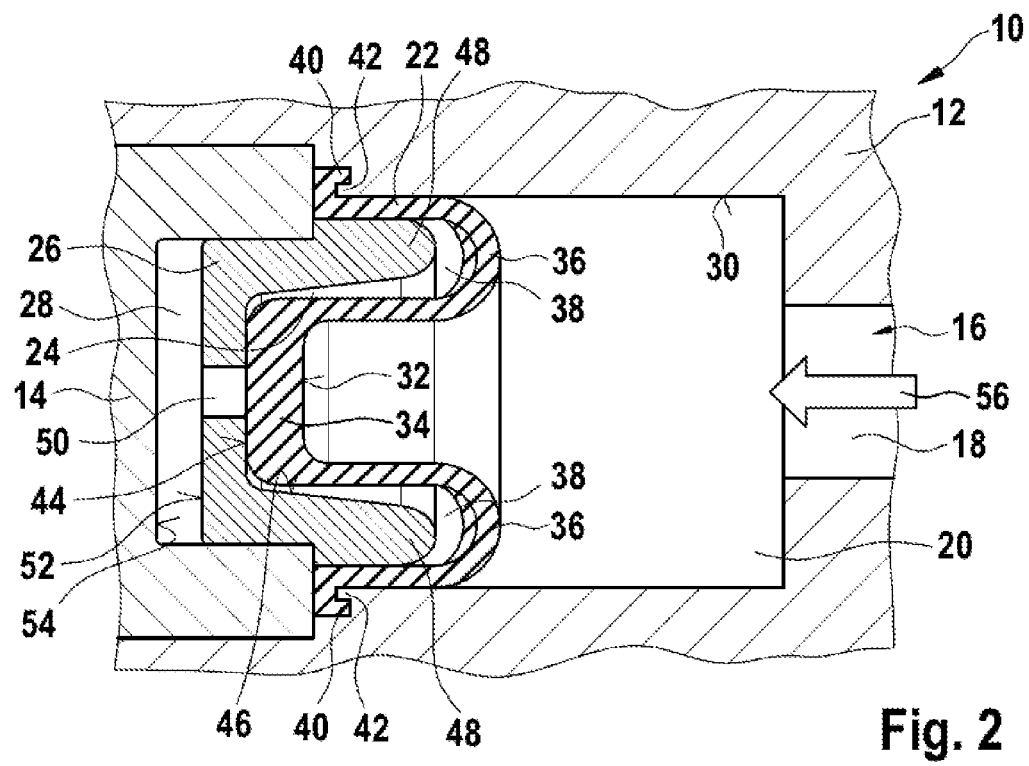
FIG. 2 shows the brake system damping device in FIG. 1 with a first hydraulic pressure applied.
Figure 3:
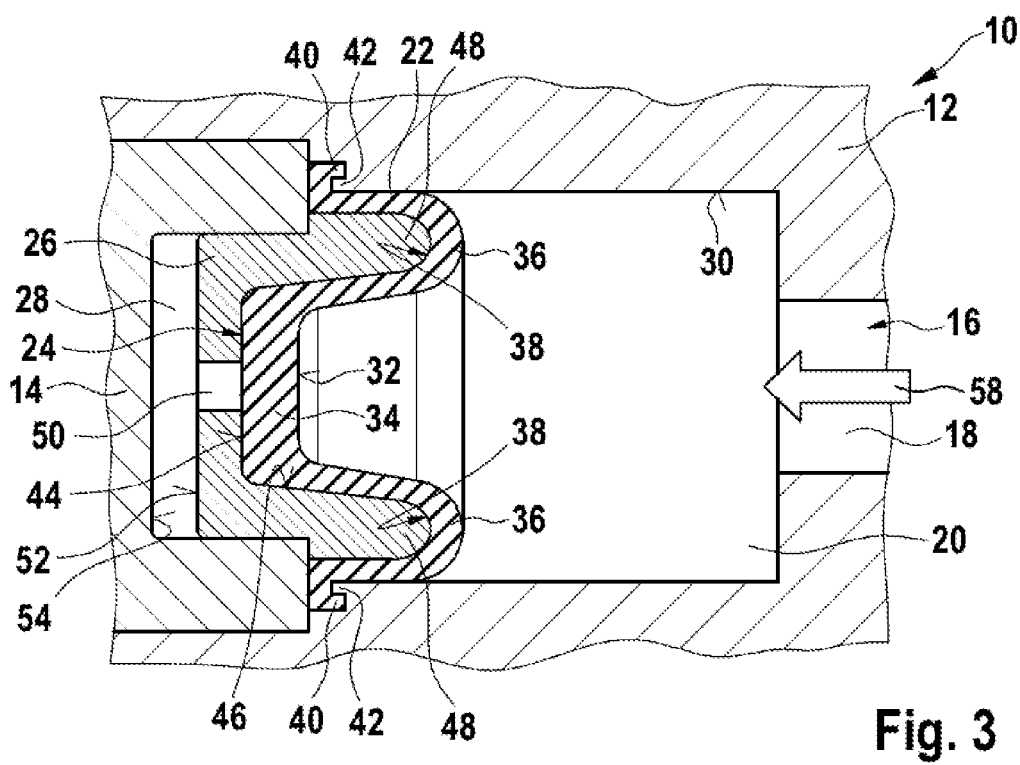
FIG. 3 shows the brake system damping device in FIG. 1 with a second hydraulic pressure applied.

FIG. 2 shows the brake system damping device 10 from FIG. 1, but in a state in which a first hydraulic pressure is applied to the first chamber 20, depicted by means of an arrow 56 in the region of the supply line 16.

As already mentioned, the closing element 34 in this case rests against the second separating element inner wall 46 of the second separating element 26 and closes the outlet 50 to the third chamber 28. Only the volume remaining in the second chamber 24 can therefore be used for further damping. In the depiction in FIG. 2, this is mainly the region about the diaphragm holding mechanism 48. The effects on damping and the braking action have already been set out in detail in the description of FIG. 1 and will not therefore be described again here.

The brake system damping device 10 from FIG. 1 is depicted in FIG. 3, but in a state in which a second hydraulic pressure is applied to the first chamber 20, depicted by means of an arrow 58 in the region of the supply line 16.

As already mentioned, the closing element 34 in this case rests against the second separating element inner wall 46 of the second separating element 26 and closes the outlet 50 to the third chamber 28. Moreover, the separating element 22 and the second separating element 26 rest against one another without in a complete manner, so that the second chamber 24 no longer has any volume. The implications of this for damping and the braking action have already been dealt with in detail in the description in FIG. 1 and will not therefore be described again here.

Figure 4:
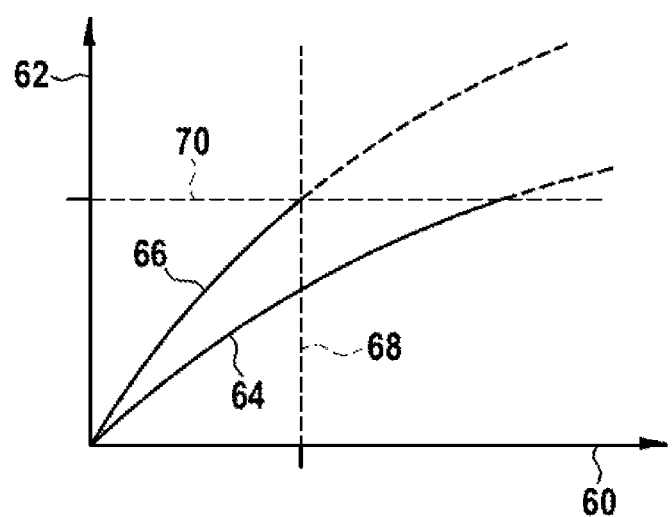
FIG. 4 shows a graph with characteristic curves showing the correlation between pressure and volume uptake in brake system damping devices and FIG. 5 shows a second example of a brake system damping device of this kind.

FIG. 4 shows a graph depicting the correlation between a pressure 60 and a volume uptake 62 in brake system damping devices of this kind. The pressure 60 in this case is depicted on the x-axis and the volume uptake 62 on the y-axis. A first characteristic curve 64 and a second characteristic curve 66 extend from a coordinate origin of the graph. In addition, the graph shows a vertical dotted line 68 crossing the x-axis and a horizontal dotted line 70 crossing the y-axis.

The first characteristic curve 64 shows the correlation between pressure and volume uptake for a brake system damping device with a small volume and medium which is available for damping. For reasons of simplicity, the volume of the second chamber 24 in FIG. 1 is assumed here for this characteristic curve 64.

The second characteristic curve 66 which extends above the first characteristic curve 64 shows the correlation between pressure and volume uptake for a brake system damping device 10 with a comparatively large volume for this purpose and medium which is available for damping. To simplify matters, the total volume of the second and third chambers 24, 28 in FIG. 1 is assumed here for the characteristic curve 66.

A predefined pressure value 68 is depicted using the vertical dotted line which crosses the x-axis, said pressure value forming the upper limit of a pressure region which is relevant to pulsation damping in brake systems of this kind. This relevant pressure region therefore extends from the coordinate origin to the dotted line.

A volume limit stop 70 for the brake system damping device 10 according to the disclosure is depicted using the horizontal dotted line which crosses the y-axis. This volume limit stop lies roughly at the volume of the second chamber 24 in FIG. 1.

By means of a corresponding layout of the respective volumes of the second and third chamber 24, 28, the brake system damping device 10 is adjusted to the relevant pressure region and the desired elasticity or damping action in this pressure region. When there is optimal adjustment, as depicted in the graph in FIG. 4, the dotted lines 68, 70 intersect with the characteristic curve 66 at a point.

Figure 5:
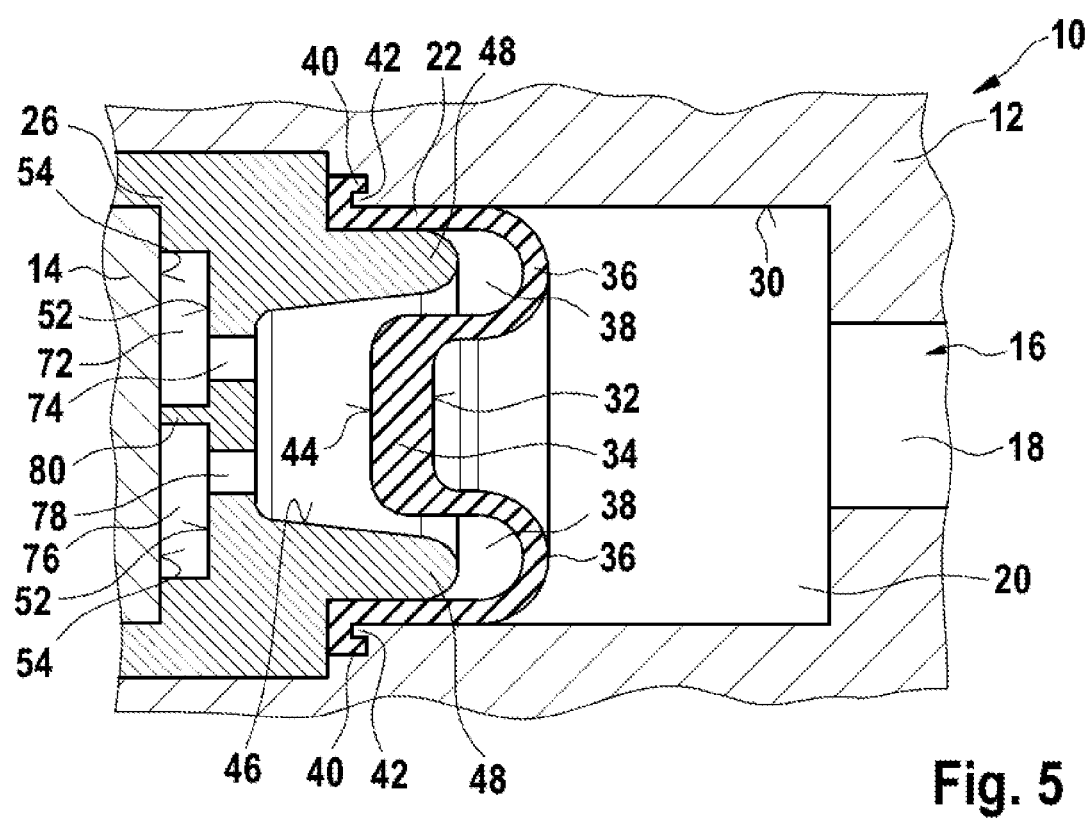

A brake system damping device 10 is depicted in FIG. 5 which differs from that in FIG. 1 only in the region which the first separating element 22 configured as a rolling diaphragm faces with the first separating element outer wall 44. The separating element 22 itself and the region which the separating element 22 faces with the first separating element inner wall 32 completely coincide with FIG. 1 and will not be described again here.

The main difference from the brake system damping device 10 in FIG. 1 is that rather than the third chamber 28 and the associated outlet 50 in FIG. 1, the brake system damping device 10 here in FIG. 5 has a first sub-chamber 72 with an outlet 74 and a second sub-chamber 76 with a second outlet 78. In this case, the two sub-chambers 72, 76 are separated by means of a partition wall 80. A further difference from FIG. 1 is that here in FIG. 5 the second separating element 26 extends up to the housing inner wall 30 and separates the cover 14 therefrom.

All further features correspond to those in FIG. 1. Hence, the second chamber 24 is also surrounded in this case by the first separating element outer wall 44 and a second separating element inner wall 46 of the second separating element 26. Likewise, the second separating element 26 in this case extends with a diaphragm holding mechanism 48 into the membrane fold depression 38 of the separating element 22. In addition, the sub-chambers 72, 76 alongside the partition wall 80, like the third chamber 28 in FIG. 1, are surrounded by the second separating element outer wall 52 and a cover inner wall 54 of the cover 14.

The method of operation in this case is similar to that of the brake system damping device 10 in FIG. 1. If hydraulic pressure is present in the first chamber 20, the separating element 22 is deformed here too, such that the gas volume in the second chamber 24 is reduced. In this way, the closing element 34 moves into the second chamber 24 and, from a given hydraulic pressure which ideally corresponds to the upper limit of the relevant pressure region, it rests against the second separating element 26 and closes the outlets 74, 78 to the sub-chambers 72, 76.

As soon as the hydraulic pressure present in the first chamber 20 abates, the separating element 22 configured as a rolling diaphragm moves back into its initial state or its initial position. In this way, the outlets 74, 78 are then opened again and the sub-chambers 72, 76 are again connected to the second chamber 24.

Figure 6:
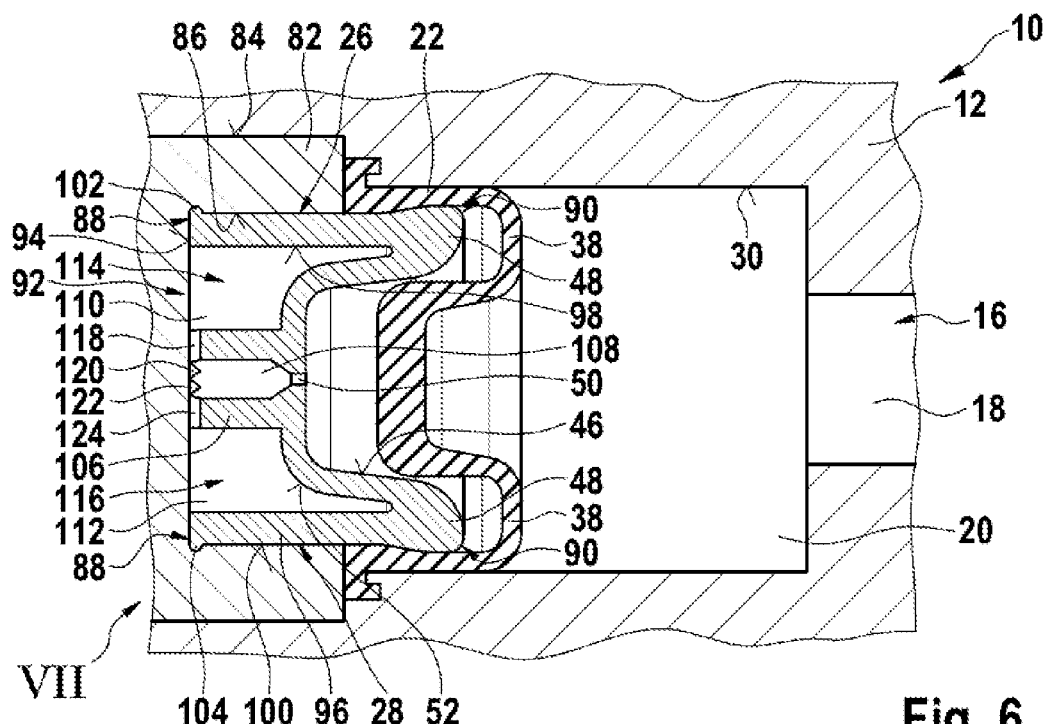
FIG. 6 shows a third example of a brake system damping device of this kind.

FIG. 6 shows a brake system damping device 10 which differs from that in FIG. 1 in terms of the replacement of the cover 14 and, in particular, the design of the second separating element 26. The remaining components in FIG. 6 correspond to those in FIG. 1 and are not described again here. In the depicted state of the brake system damping device 10, no hydraulic pressure 18 is applied to the first chamber 20 at the supply line 16, only insofar as the first separating element 22 is located in a standard form or initial form as in FIG. 1. In FIG. 6 a component 82 with a component outer wall 84 and a component inner wall 86 replaces the cover 14 in FIG. 1. This component 82 can likewise be used as a cover here. The component 82 in this case rests against the first separating element 22 in such a manner that the second separating element 26 is completely enclosed by the component 82 and the first separating element 22. The component inner wall 86 has a depression 88 surrounding the second separating element 26 which is arranged at a maximum distance in this case from the first separating element 22. The component outer wall 84 rests against the housing 12 or the housing inner wall 30 thereof.

The second separating element 26 is configured on the side of the separating element inner wall 46 substantially just as with the second separating element 26 in FIG. 1. The difference here lies only in that the diaphragm holding mechanism 48 is configured in a manner splayed outwardly or in the direction of the housing inner wall 30 within the diaphragm fold depression 38 in a trumpet or bead shape, referred to here as an outer curvature 90. On the side of the separating element outer wall 52, the second separating element 26 has a rib structure 92 which extends from the separating element outer wall 52 to a structure end side 94 and thereby penetrates the entire third chamber 28. The rib structure 92 is integrally formed with the second separating element 26 and in addition surrounded by a rib casing 96 with a casing inner wall 98 and a casing outer wall 100. The rib casing 96 extends from the separating element outer wall 52, more accurately from the diaphragm holding mechanism 48, up to the structure end side 94. Multiple locking elements are arranged on the casing outer wall 100 adjacent to the structure end side 94, in this case only locking elements 102 and 104 are visible and these are arranged locked into the depression 88.

A circular hollow cylinder 106 with a cylinder cavity 108 is arranged within the center of the rib structure 92, which circular hollow cylinder is positioned on the separating element outer wall 52 in such a manner that the outlet 50 leads to the cylinder cavity 108. Multiple structural ribs, of which only structural ribs 110 and 112 can be seen here, extend from the circular hollow cylinder 106 to the rib casing 96 or the casing inner wall 98 thereof. The structural ribs 110, 112 divide the third chamber 28 within the ring casing 96 into multiple structural sub-chambers, whereof only the structural sub-chambers 114 and 116 are visible in this case. The structural chambers are connected to the cylinder cavity 108 by means of connection channels, whereof only the connection channels 118, 120, 122 and 124 are visible in this case. The connection channels 118, 120, 122, 124 in this case are arranged on the structure end side 94.

The brake system damping device 10 depicted here is comparable with the brake system damping device 10 in FIG. 1 in terms of its basic method of operation.

Here, too, the component 82 rests against the first separating element 22 in a stabilizing manner, for example, as with the cover 14 in FIG. 1. In addition, in this brake system damping device 10 depicted in FIG. 6, there are the supporting function of the rib structure 92, which also allows a gradual adjustment of the degree of damping, and also the locking anchoring of the second separating element 26 in the component 82, in this case configured as a cover. The supporting effect is achieved in that all components of the rib structure 92 extend from the separating element outer wall 52 to the structure end side 94, wherein the structure end side rests against the component inner wall 86. The damping degree can be adjusted by means of the closure of one or multiple connection channels 118, 120, 122, 124 to the structural sub-chambers 114, 116. Locking anchoring in the component 82 takes place by means of the locking elements 102, 104. During insertion of the second separating element 26 into the component 82 or during the sliding of the component 82 onto the second separating element 26, the locking elements 102, 104 are pressed in inwardly, in other words into the rib casing 96. As soon as the structure end side 94 reaches the component inner wall 86, the locking elements 102, 104 engage with the depression 88 in the component 82 provided for this purpose.

Figure 7:
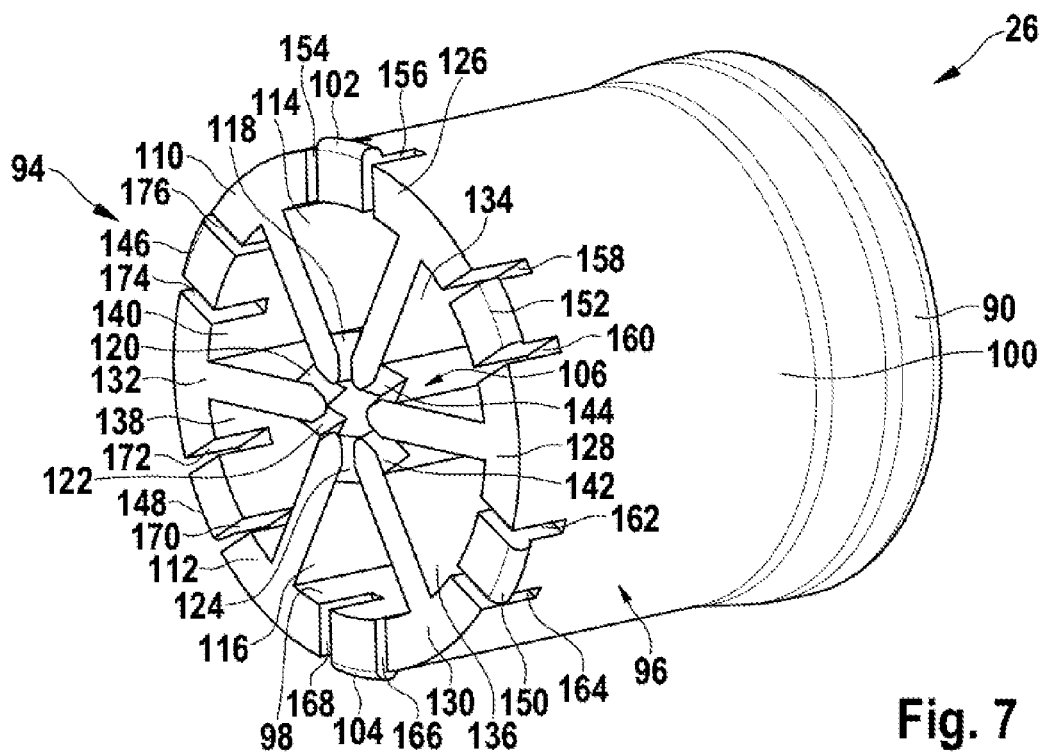
FIG. 7 shows view VII of a separating element of the brake system damping device according to FIG. 6.
Figure 8:
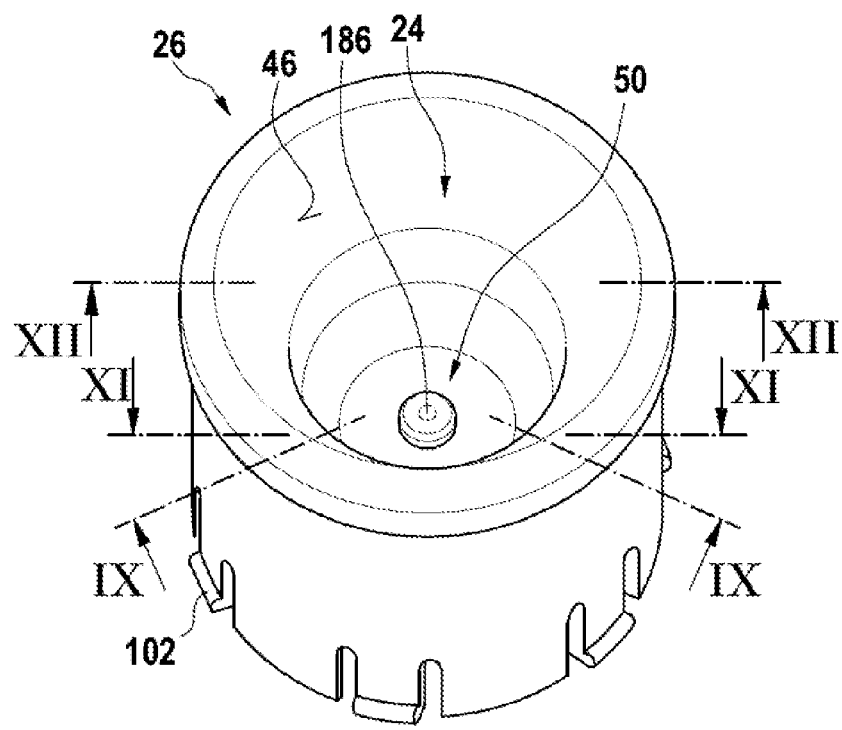
FIG. 8 shows a perspective view of an exemplary embodiment of a separating element of a brake system damping device according to the disclosure.
Figure 9:
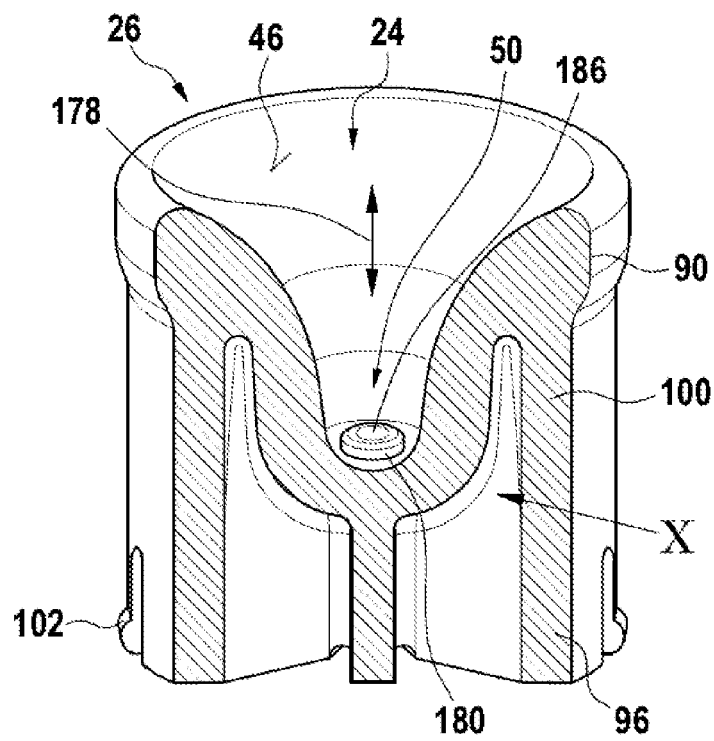
FIG. 9 shows section IX-IX according to FIG. 8.
Figure 10:
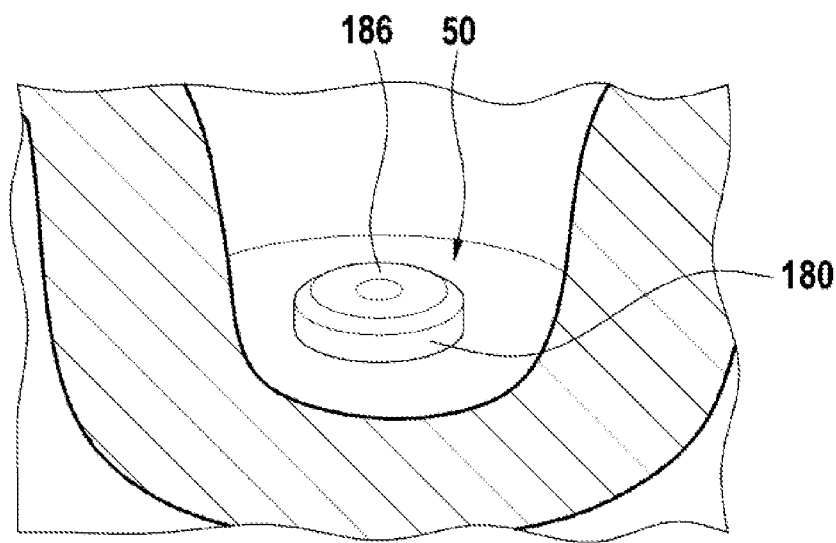
FIG. 10 shows detail X according to FIG. 9.
Figure 11:
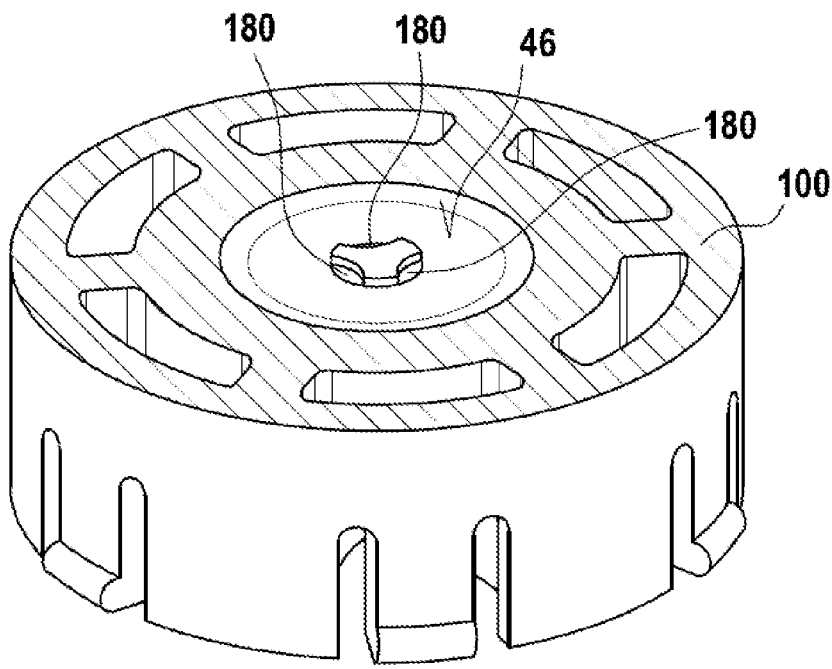
FIG. 11 shows section XI-XI according to FIG. 8.
Figure 12:
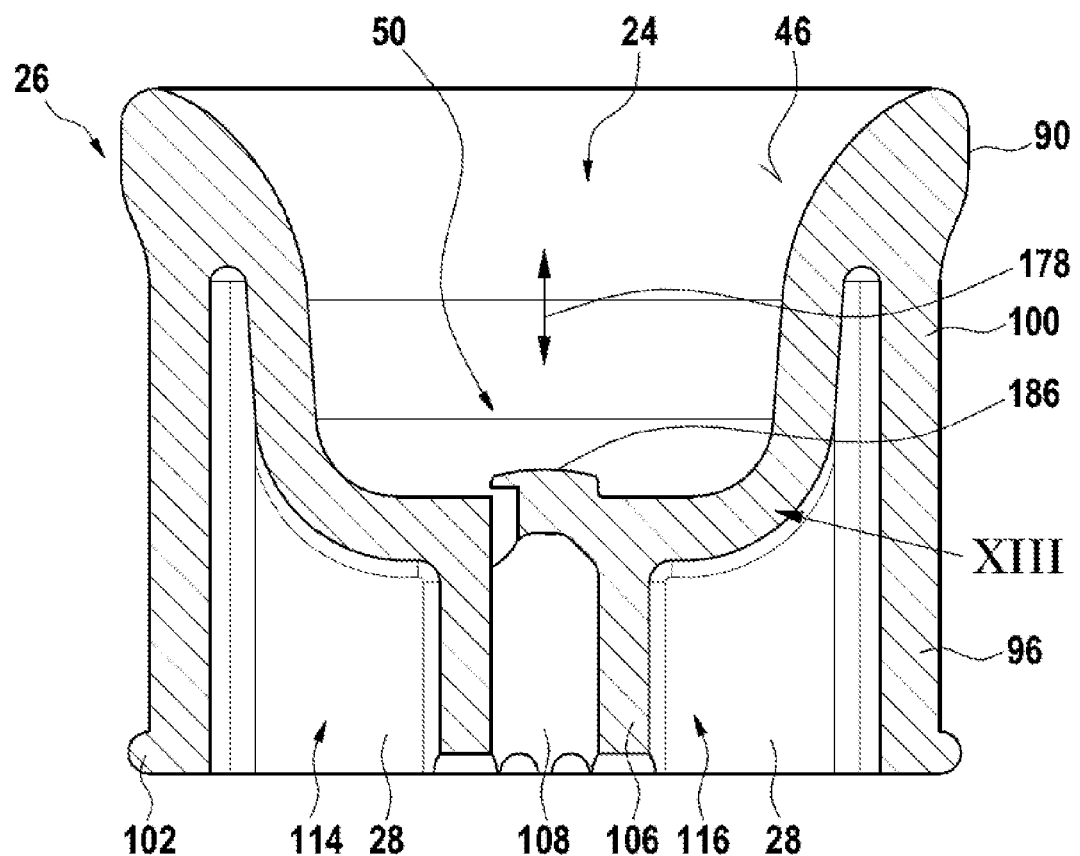
FIG. 12 shows section XII-XII according to FIG. 8.
Figure 13:
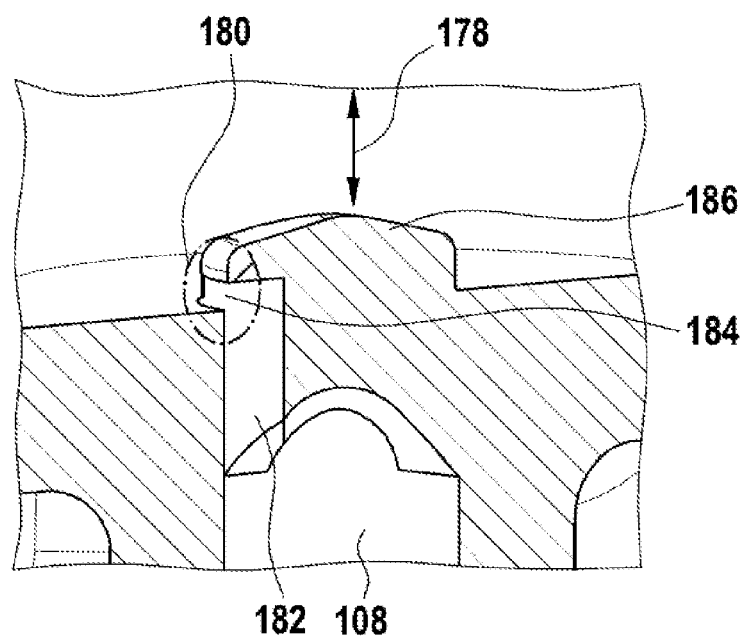
FIG. 13 shows the detail XIII according to FIG. 12.

The second separating element 26 from FIG. 6 is shown in perspective in FIG. 7 looking at the structure end side 94. The rib structure 92 is therefore particularly clearly visible. Clearly visible in this case are also the outer curvature 90 and the casing outer wall 100. Alongside the structural ribs 110 and 112, the other structural ribs 126, 128, 130 and 132 are also depicted which extend from the circular hollow cylinder 106 to the rib casing 96 or the casing inner wall 98 thereof. The structural sub-chambers 114, 116, 134, 136, 138, 140 are arranged between the structural ribs 110, 112, 126, 128, 130, 132 and connected by means of the connection channels 118, 120, 122, 124, 142, 144 to the cylinder cavity 108. On the casing outer wall 100 and on the structure end side 94, the other locking elements 146, 148, 150, 152 are also depicted alongside the locking elements 102 and 104. Each of these locking elements 102, 104, 146, 148, 150, 152 is arranged abutting two or multiple casing slots 154, 156, 158, 160, 162, 164, 166, 168, 170, 172, 174, 176, wherein the casing slots 154, 156, 158, 160, 162, 164, 166, 168, 170, 172, 174, 176 extend from the structure end side 94 in the direction of the outer curvature 90.

The components newly depicted here which share names with those shown in FIG. 6, such as the other locking elements 146, 148, 150, 152, for example, also have the same function. The functionality of components of this kind is not therefore explained again. The casing slots 154, 156, 158, 160, 162, 164, 166, 168, 170, 172, 174, 176 are visible for the very first time and therefore have not yet been described in terms of their functionality. They not only fulfil the purpose of supplying additional volume for the third chamber 28. In particular, the casing slots 154, 156, 158, 160, 162, 164, 166, 168, 170, 172, 174, 176 divide the rib casing 96 from the point of view of the structure end side 94 in such a manner that the locking elements 102, 104, 146, 148, 150, 152 are separated. Depending on the flexibility of the material of the second separating element 26, the regions of the rib casing 96 on which one of the locking elements 102, 104, 146, 148, 150, 152 is arranged, press inwardly more or less lightly. This means that the assembly of the second separating element 26 described in FIG. 6 and/or of the component 82 is made substantially easier.

FIGS. 8 to 13 illustrate an exemplary embodiment in which the outlet 50, and also the cylinder cavity 108 which is downstream in flow terms, are formed on a second separating element 26 in a particular manner.

It should be initially defined in this case that the first separating element 22 moves with its closing element 34 when the second chamber 24 is made larger and smaller and, in particular, during the opening and closing of the outlet 50, in a movement direction 178. On its side facing the closing element 34, the outlet 50 is not configured with an outlet opening, as would actually be expected and is depicted in FIGS. 1 to 7, the cross-sectional area of said outlet being located transversely to this movement direction 178. Instead of this, three outlet openings 180 are provided at the outlet 50 which are individually attached in a fluid-conducting manner by means of an outlet channel 182 in each case to the cylinder cavity 108, wherein the cylinder cavity 108 forms a central outlet channel in this case which leads further into the third chamber 28 which is downstream in flow terms and, in particular, the structural sub-chambers 114 and 116 thereof.

The outlet openings 180 are formed individually each with a cross-sectional area 184 which is located beneath a central, convex cap 186 in the base region of the cup-shaped separating element inner wall 46 and are substantially oriented in the movement direction 178 of the closing element 34 in this case. "Substantially" in this case means that the cross-sectional area 184 extends with its surface plane precisely in the movement direction 178 or at least at an angle of under 10°, in particular of under 5°, to this movement direction 178.

The individual cross-sectional area 184 in this case exhibits the shape of a slot, in other words compared with its slot length it has a comparatively small slot width. In addition, the separating element 26 in the present case is advantageously produced by means of an injection molding process in an injection mold having two mold halves (not shown). In this case, the cross-sectional area 184 is configured as an interface which is formed precisely during contact between the upper and lower mold halves in this case. This can clearly be seen in FIG. 13, wherein the upper mold half is then located above and alongside the cap 186 and the lower mold half projects into the cylinder chamber or central outlet channel 108 and into the outlet channels 182.

The invention claimed is:

1. A brake system damping device comprising:
a first chamber to which hydraulic pressure is applied;
a second chamber in which a compressible medium is located;
a first separating element that separates the first chamber from the second chamber;
a third chamber in which the compressible medium is located;
a second separating element configured to separate the second chamber from the third chamber, the second chamber being connected to the third chamber in a medium-conducting manner by an outlet defined in the second separating element; and
a closing element configured to move in a movement direction so as to close the outlet and disconnect the second chamber from the third chamber as soon as the hydraulic pressure in the first chamber has reached a predefined pressure value, the closing element moving with the first separating element,
wherein the outlet has a first side facing toward the second chamber, the first side including at least one outlet opening having a cross-sectional area that extends in a plane that is at an angle of less than 10° relative to the movement direction of the closing element.

2. The brake system damping device according to claim 1, wherein the at least one outlet opening is configured as a slot.

3. The brake system damping device according to claim 1, wherein the at least one outlet opening includes between two and four outlet openings, each of which extends in a respective plane that is at an angle of less than 10° relative to the movement direction of the closing element.

4. The brake system damping device according to claim 1, further comprising a convex cap that covers the outlet on the first side.

5. The brake system damping device according to claim 1, wherein the outlet has a second side, which faces away from the second chamber, the second side being formed by a central outlet channel.

6. The brake system damping device according to claim 1, wherein the second separating element is produced by means of injection molding in an injection mold with a lower mold half and an upper mold half and the at least one outlet opening is produced as an interface between the lower mold half and the upper mold half.

7. The brake system damping device according to claim 1, wherein the second separating element includes a support structure extending in the third chamber.

8. The brake system damping device according to claim 1, wherein the first separating element includes a diaphragm.

9. The brake system damping device according to claim 1, wherein the first separating element is produced from an elastomer.

10. The brake system damping device according to claim 3, wherein the at least one outlet opening includes three outlet openings.

11. The brake system damping device according to claim 8, wherein the diaphragm is a rolling diaphragm.

12. The brake system damping device according to claim 9, wherein the first separating element is produced from ethylene-propylene-diene rubber.

13. The brake damping device according to claim 1, wherein the plane in which the cross-sectional area of the at least one outlet opening extends is at an angle of less than 5° relative to the movement direction of the closing element.

14. The brake damping device according to claim 1, wherein the plane in which the cross-sectional area of the at least one outlet opening extends along the movement direction of the closing element.

15. The brake damping device according to claim 1, wherein the second separating element includes a concave portion having a base surface surrounding the outlet, the closing element configured to seal against the base surface to close the outlet and disconnect the second chamber from the third chamber.

* * * * *